United States Patent [19]
Lass

[11] Patent Number: 6,092,153
[45] Date of Patent: *Jul. 18, 2000

[54] SUBSETTABLE TOP LEVEL CACHE

[76] Inventor: Stanley Edwin Lass, R2 Box 22A, Ogden, Iowa 50212

[ * ] Notice: This patent issued on a continued prosecution application filed under 37 CFR 1.53(d), and is subject to the twenty year patent term provisions of 35 U.S.C. 154(a)(2).

[21] Appl. No.: 08/733,334

[22] Filed: Oct. 17, 1996

Related U.S. Application Data

[63] Continuation of application No. 08/551,230, Oct. 31, 1995, which is a continuation of application No. 07/989,980, Dec. 11, 1992, which is a continuation of application No. 07/762,634, Sep. 18, 1991, which is a continuation of application No. 07/270,680, Nov. 14, 1988.

[51] Int. Cl.$^7$ .................................................. G06F 12/12
[52] U.S. Cl. ............................................................ 711/133
[58] Field of Search ................................... 395/445, 456, 395/460, 486; 711/118, 129, 133, 159

[56] References Cited

U.S. PATENT DOCUMENTS

| | | | |
|---|---|---|---|
| 4,214,303 | 7/1980 | Joyce et al. | 364/200 |
| 4,225,922 | 9/1980 | Porter | 364/200 |
| 4,228,503 | 10/1980 | Waite et al. | 364/DIG. 1 |
| 4,264,953 | 4/1981 | Douglas et al. | 395/400 |
| 4,371,929 | 2/1983 | Brann et al. | 364/200 |
| 4,463,424 | 7/1984 | Mattson et al. | 395/456 |
| 4,464,712 | 8/1984 | Fletcher | 395/425 |
| 4,502,110 | 2/1985 | Saito | 395/450 |
| 4,503,501 | 3/1985 | Coulson et al. | 395/425 |
| 4,530,049 | 7/1985 | Zee | 364/200 |
| 4,580,240 | 4/1986 | Watanabe | 395/445 |
| 4,637,024 | 1/1987 | Dixon et al. | 364/DIG. 1 |
| 4,707,784 | 11/1987 | Ryan et al. | 395/450 |
| 4,713,755 | 12/1987 | Worley, Jr. et al. | 711/123 |
| 4,719,568 | 1/1988 | Carrubba et al. | 364/200 |
| 4,725,945 | 2/1988 | Kronstadt et al. | 395/425 |
| 4,783,736 | 11/1988 | Ziegler et al. | 364/200 |
| 4,847,755 | 7/1989 | Morrison et al. | 364/200 |
| 4,905,141 | 2/1990 | Brenza | 395/425 |
| 4,910,666 | 3/1990 | Nibby, Jr. et al. | 364/200 |
| 4,912,631 | 3/1990 | Lloyd | 364/200 |
| 4,920,477 | 4/1990 | Colwell et al. | 364/200 |
| 4,942,521 | 7/1990 | Hanawa et al. | 364/200 |
| 4,943,908 | 7/1990 | Emma et al. | 364/200 |
| 4,953,079 | 8/1990 | Ward et al. | 364/200 |
| 4,962,451 | 10/1990 | Case et al. | 395/425 |
| 4,992,934 | 2/1991 | Portanova et al. | 364/200 |
| 5,019,971 | 5/1991 | Lefsky et al. | 395/250 |

OTHER PUBLICATIONS

Weissberger, "On–Chip Cache Memory Gives μPs a Bis–System Look", Oct. 1983, Electronic Design, p 133–139, vol. 31 No. 21.

Veljko Milutinovic et al, "Architecture Kompiler Synergism in GaAs Computer System" Computer May 87, pp. 84–90.

Stanley Lass "Wide Channel Computers" Computer Architecture News Jun. 1987.

Stanley Lass, "Multiple Instructions/Operands Per Access to Cache Memory" Computer Architecture News Mar. 1988.

Stanley Lass, "Shared Cache Multiprocessing with Pack Computers" Computer Architecture News Jun. 1988.

*Primary Examiner*—Eddie P. Chan
*Assistant Examiner*—Kevin L. Ellis

[57] ABSTRACT

As computers execute faster relative to memory, they require more memory bandwidth. Improved memory bandwidth can be achieved by having the compiler group contiguous memory requests. The contiguous words are called packs. The basic working premise of the subsettable pack cache is to load a pack into a subset of the cache, make the pack accessable to the processor indirectly through an auto-increment pointer, and to load anything else into the subset until the processor is finished with the pack. The auto-increment pointers are redirectable relative to the pack's begin point in the cache, a pack can begin anywhere within a block. Block parallel transfers between the top level subsettable cache and the next level down memory improve the cache bandwidth. Thrashing is reduced by using cache subsetting to separate cache uses. Cache like behavior within subsets is provided.

6 Claims, 2 Drawing Sheets

Direct Mapped Top Level Subsettable Cache

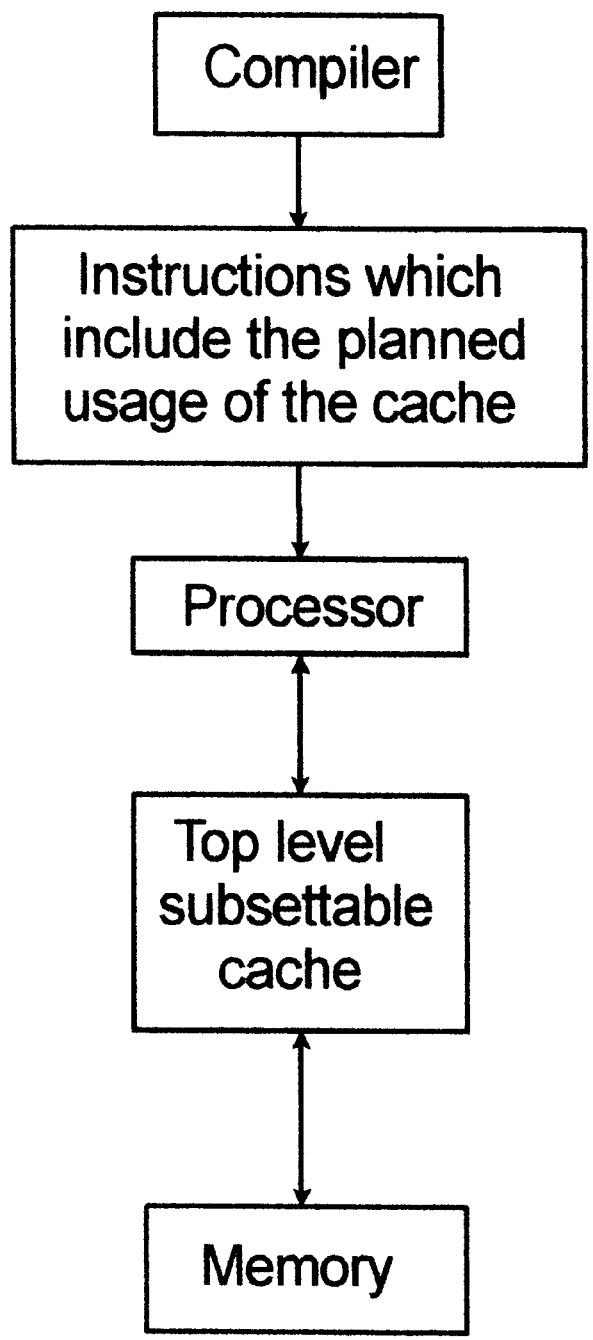
Figure 1. Top Level Subsettable Cache

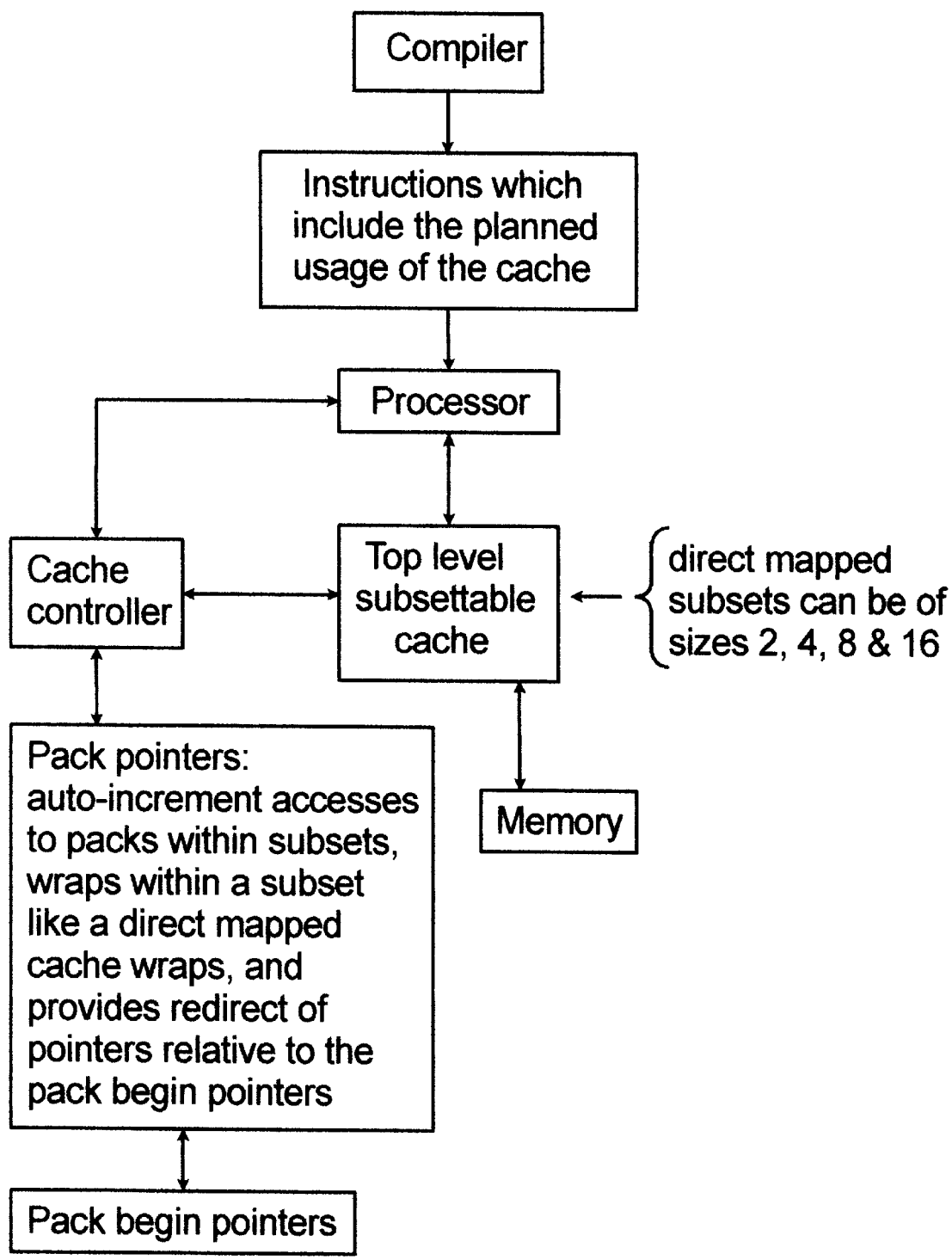
Figure 2. Direct Mapped Top Level Subsettable Cache

SUBSETTABLE TOP LEVEL CACHE

A continuation of Ser. No. 67/270,680 filed Nov. 14, 1988. A continuation of Ser. No. 07/762,634 filed Sep. 18, 1991. This application is a continuation of Ser. No. 07/989/980, filed Dec. 11, 1992. This application is a continuation of Ser. No. 08/551,230 Filed: Oct. 31, 1995.

BACKGROUND OF THE INVENTION

1. Field of the Invention

This invention relates in general to computers, and in particular to top level cache design.

2. Prior Art

The survey article[1] covers cache prefetching and many other aspects of cache memory design.

References 2, 3, and 4 describe prior work leading up to the present invention.

A conventional cache operates without the benefit of the information available to a compiler.

Thrashing occurs when the use of two or more blocks contend for the single available block in a direct mapped cache. Restated, thrashing occurs when needed information in a block is deleted to to make room for needed information in another block, later, the original block must be reloaded.

The objects of the present invention are to reduce the frequency of memory accesses by grouping the memory accesses into fewer accesses but with more words per access, reduce thrashing by using cache subsetting to separate cache uses, reduce cache access time by using cache addresses to access the cache, provide cache like behavior within the subsets, and provide an efficient method to timeshare the processor.

[1] Veljko Milutinovic, David Fura, Walter Helbig, Joseph Linn, "Architecture/Compiler Synergism in GaAs Computer Systems" Computer May 87, pp 84–90.
[2] Stanley Lass "Wide Channel Computers" Computer Architectue News June 1987
[3] Stanley Lass "Multiple Instructions/Operands per Access to Cache Memory" Computer Architectue News March 1988
[4] Stanley Lass "Shared Cache Multiprocessing with Pack Computers" Computer Architectue News June 1988

SUMMARY OF THE INVENTION

As computers execute faster relative to memory and also require more memory bandwidth, memory bandwidth can be improved by averaging more than one word per memory request. Improved memory operation results from having the compiler group memory requests into one or more contiguous words called packs, The basic working premise of the subsettable pack cache is to load a pack into a subset of the cache, make the pack accessable to the processor indirectly through pointers, and not to load anything else into the subset until the processor is finished with the pack.

Instructions and data are packaged into packs much like vector elements are packaged into a vector for a vector processor. A pack has a starting memory address and a length.

Thread switching capability permits two program threads to be executed alternately. The thread switch enables are coded within the executing instructions. The enables would be timed to overlap much the pack access time, i.e. while accessing a pack, the computer can be usefully busy on another program thread.

BRIEF DESCRIPTION OF THE DRAWINGS

FIG. 1 shows a top level subsettable cache.

FIG. 2 shows a direct mapped top level subsettable cache.

DETAILED DESCRIPTION

Packs are contiguous groups of words that are likely to be used together. A pack has a starting memory address and a length measured in words. The compiler defines the packs based on it's examination of the program. Packs can contain sequences of instructions, one or more variables, parameter(s), vectors, or records.

A subsettable top level cache and a suitable instruction set permits the compiler to plan cache memory usage and express that planned usage in instructions. The packs containing data and/or instructions likely to be needed close in execution time would be allocated to different subsets of the cache. This subsetting of the cache avoids thrashing except when the compiler uses the same subset for two uses. A pack that has been loaded will remain in it's subset until another command is executed that loads into the same subset. This predictability permits cache addresses to be used to access the cache.

Before accessing a pack cache for the words in a pack, a pack load command loads the needed blocks containing the pack into command specified block(s) in the cache. If one or more of the blocks containing the pack are already present in the cache, those block(s) are not reloaded. In conjunction with this process, the pack's starting address within the cache is saved in a pointer. The processor-accesses the pack contents by using the pointer. Note that the starts of packs may shift within a block, e.g. packs read from a stack in memory can start at any position within a block. The pointer can be redirected relative to the pack begin, thereby providing random access to the words within a pack.

The compiler determines which cache blocks comprise the subsets of a subsettable pack cache. For each time that a pack is cache resident, the compiler allocates a pack number. At code generation time, the pack number and the number of the first block of the subset are encoded into the commands. The processor specifies the pack number when it reads or writes a cache resident pack. The subsets may change over time.

In the following, memory will be used to mean memory or a second level cache, access will be used to mean read or write, and opcode will be used to mean instruction or command operation code.

The following describes some aspects of a top level subsettable pack cache.

The pack cache has 16 blocks of 4 words each.

The write flag associated with each word is set when the processor writes to the word.

The presence flag associated with each block indicates whether the cache block is waiting for a block from memory.

The block address word associated with each block holds the block's memory address.

There are eight sets of pack registers for cache packs. Each set has a pack pointer, a pack begin pointer, an end pack flag, and a wraparound flag. A pack number refers to one of the eight sets.

During any given clock, the processor can read/write a word or the cache controller can load/store a block from/to memory. Blocks are not shifted as they are transferred between the cache blocks and memory blocks.

Commands are a subset of the instructions, commands include load, store, clear, save, and cancel operations on packs. The cache controller executes the commands and controls the block transfers between cache and memory.

When a command which load packs or store packs is executed, the pack's begin point in the cache is set into the specified pack pointer and pack begin pointer.

The processor accesses a cache resident pack indirectly through the pack's pointer. The pack pointer is an auto-increment pointer, similar to the Motorola 68000 auto-increment indirect addressing mode. For packs which fit within the subset's blocks, the pack pointer can be redirected relative to the pack begin pointer. The redirect provides random access to the pack. The wraparound flag controls whether redirecting wrapsaround.

Each cache resident pack's end pack flag is true whenever the pack pointer points to the pack's last word plus one, otherwise it is false. Each of the eight end pack flags is available to the processor for testing.

For commands which load packs, as the cache controller loads the block(s) containing a pack, it checks if each needed block is already loaded. If the block is already loaded, the redundant block load is aborted.

Performing the above check consists of comparing the block address associated with the cache destination block to the memory address of the block to be loaded.

If the block is not already loaded, the block presence flag is reset, then is later set as the block is loaded into the cache. When accessing the cache, the processor stalls if a presence flag is reset, but resumes execution when the presence flag is set. This prevents the processor from proceeding with invalid information.

The load pack and store pack commands move the first block to/from the specified cache start block. The second block, if any, goes to/from the next higher numbered cache block, etc. The load and store pack commands reset the wraparound flag such that the pack pointer will increment without wraparound over the blocks containing the specified pack. Also, redirects are without wraparound.

The store pack command performs the setup for an eventual store of the pack. The setup consists of resetting the write flags of all the words in the cache resident pack and calculating the pack's block addresses, then placing them in the corresponding block address words. After the processor has written none, some, or all of the words in the pack, a save pack command stores the written to words in the pack to memory.

The update pack command combines a load pack command and a store pack command, after the pack is loaded, the processor may write words to the pack, and then a separate save pack command stores the pack's written to words to memory. A reset presence flag will prevent a write to a cache block before the block has arrived from memory.

Sequential load/store pack commands are used for the sequential reading and writing of long packs.

The sequential load/store pack commands and the mapped load/store commands utilize direct mapping of blocks to the subset. The block number in a command specifies the first of two direct mapped blocks.

The execution of one of the above direct mapped commands sets the wraparound flag for the specified pack such that as the processor accesses the last word in the second block, the pack pointer automatically wraps around to the beginning of the first block.

For the sequential load pack command, while one block is being read within the processor, the other block acts as a buffer for the block move from memory. The cache controller loads the next needed block whenever a cache block is empty, the pack's command prioirity is highest, and the memory is available.

For the sequential store pack command, while one block is being written within the processor, the other block acts as a buffer for the block moves to memory. The cache controller writes the next block whenever a cache block is full, the pack's command prioirity is highest, and the memory is available.

A save pack command executed after a sequential store pack command or a store pack command stores away any remaining written to words in the pack and makes the actual pack length count available to the processor such that subsequent commands can read the pack with an accurate count.

The mapped load/store pack commands are useful for table lookups, array accesses, and stack accesses where successive accesses are to nearby elements. These commands are used with short packs The short packs must always fit within two blocks. Redirects wraparound for these commands.

Using the mapped load pack command with short packs provides the equivalent of a direct mapped subcache with two blocks. It behaves like a two block mini-cache, i.e. each time a block is loaded into the direct mapped two block subset of the cache, it remains such that if a pack in the same block is loaded again, the redundant block load will be detected and discarded.

Using the mapped store pack command with short packs provides the equivalent of a direct mapped subcache with two blocks. A clear pack command clears the write flags in the two block subset, then after a succession of mapped store packs, a save pack command stores away any remaining written to words in the two block subset.

During the above succession of mapped store packs, a mapped store pack to a memory block that is already cache resident results in that the cache resident block will accumulate the current pack's written to words for this block as well as any prior written to words for the block. The written to words in a displaced block are written to memory.

When a multiple block load pack command needs to be aborted before it's finished executing, a pack cancel command cancels any remaining block loads for the specified pack.

When main memory has been updated by new data from the input/output system or another computer sharing the memory, the detection and discarding of redundant block loads could lead to a stale data problem in the pack cache. To provide for this case, alternate opcode versions of the load pack commands force a new load of the blocks which contain the pack.

For a cache context save and restores a save context commands saves all cache information including block addresses, pack pointers, etc. The load context command restores all of the saved information. A more refined version of these commands would provide partial save and restore of the cache information.

Even though the command execution as described is sequential and without interruption, in practice, several commands may be in progress at once, e.g. the loop for adding two vectors would have two load pack commands and a write pack command active at the same time. A priority scheme based on nearness to underflow for sequential load packs and nearness to overflow for sequential store packs could be used. Also, the short pack commands would be given an intermediate priority and a command which is currently causing a processor stall would be given highest priority.

In addition to executing the program commands, the cache controller could execute commands which perform input/output operations.

Also, the cache controller transfers blocks in/out of the cache whenever the cache is not being accessed by the processor and the need exists.

A number of advantages will be described next.

The sequential access provided by the auto-incrementing pack pointer works well for instructions, vectors, and sometimes for records and variables. Redirecting of the pack pointer permits the repetitive use of the words in a pack, e.g. as the source of instructions for a loop.

By using cache addresses instead of memory addresses, faster cache access is obtained. Further, other than calculating pack addresses, much of the time needed for calculating individual addresses is saved.

By using two blocks as a subset of the cache for the sequential loading of a long pack (or vector), the thrashing of a conventional cache's contents is avoided, i.e. the reading of a long vector only disturbs the two blocks, not the whole cache. Further, since the blocks after the first block accessed when the block buffer becomes empty and the hardware is available, much, if not all, of the access time will be overlapped by computation.

The small size of the cache makes context switching by a complete save and reload of the cache reasonable.

The detection and discarding of redundant block loads and stores further reduces the number of accesses to memory.

Fewer array range checks are needed due to accessing of vectors with packs.

Since protection checks are applied to pack accesses, fewer are needed.

Since the memory requests are grouped into pack requests, a memory system is operated more efficiently and can support a faster execution rate, either within a single processor or in multiple processors.

The auto-increment approach has the potential advantage of permitting the pointed to word in each pack to be accessed ahead of time and held for possible use, thereby reducing the access delay, i.e. always keep the next pack word preaccessed such that the processor only needs to select the one of eight preaccessed words. If each access is for more than a single word, the bandwidth is potentially increased.

Since the processor makes many fewer memory requests per instruction executed, the processor and it's memory system are less closely coupled, hence the design of each can be more optimum.

Some commentary and alternatives follow.

An alternative to waiting for the cache controller to write a waited for block is to pass the requested word directly to the processor.

If hardware caches are used lower in the memory hierarchy, they would need to support pack requests.

Note that while the subsettable top level cache has a 4 word block size, the next level down in the memory hierarchy will likely have a larger block size. The cache controller could reasonably move a few blocks, if needed, per access to the next level down in the memory hierarchy.

An alternative to the mapped commands with two direct mapped blocks would be to also provide 4, 8, and/or 16 block buffered commands.

An alternative to specifying both the pack number and start block number in each pack command is to provide a command which when executed attaches the start block of a subset to the pack's set. Later commands only need to specify the pack number in order to pick up the start block of the subset.

The thread switching discussion follows.

The motivation for thread switching is to overlap the pack reads with computation on the other thread, and vice versa. Another motivation is to switch threads quickly. Most thread switch enables would be either in the command to load the last pack needed for the following computation or in a branch, usually within a loop.

Thread switching is enabled by alternate opcode versions of the load pack commands, alternate opcode versions of the unconditional branch instructions, and a thread switch enable instruction. The alternate opcodes are expected to provide most of the desired thread switch enables. Consequently, there should be only a modest reduction in code density due to thread switch enabling. The use of alternate opcodes gives the processor time to setup the thread switch while it also executes the instruction with the alternate opcode.

Each thread would have it's own cache(s) and register set. Then, as switch threads, also switch to the new thread's set of registers and cache(s). Some registers could be shared to facilitate communication between threads.

Many modifications and variations of the present invention are possible in light of the above teachings. It is therefore to be understood that within the scope of the appended claims, the invention may be practised otherwise than specifically described.

I claim:

1. A subsettable top level cache comprising:

a cache memory, means to specify subsets of the cache memory via executing instructions, means to provide cache like behavior within the subsets, and means to specify via executing instructions which subset to access for data, thereby enabling a compiler to allocate data and instructions likely to be needed close in execution time to different subsets of the said subsettable top level cache, which then avoids thrashing between those data and/or instructions allocated to different subsets of the cache.

2. A subsettable top level cache comprising:

a cache memory that is partitionable into various subsets wherein the subsets are defined and utilized under the control of a program executing on a processor, a plurality of cache blocks, a contiguous group of two cache blocks making up a subset, with said subset behaving like a direct mapped mini-cache, said subset can contain a pack of data, a pack of data being a contiguous group of words, a plurality of pack registers, each pack register containing a pack pointer, each pack register identifying a subset in the cache memory, means for accepting a pack number, a pack begin memory address and pack length from the processor, the pack number identifying one of the plurality of pack registers, means for accepting a pack number and a cache begin address from the processor, the pack number identifying one of the plurality of pack registers, and the cache begin address identifying the first block of a cache subset, means for loading the not already loaded blocks containing a pack of data from a main memory into the identified subset of the cache, means for storing the pack begin cache address into the pack pointer identified by the pack number, thereby providing the processor the information it needs to access a pack within the cache using cache addresses.

3. The subsettable top level cache of claim 2 further including means for auto-incrementing the pack pointer.

4. The subsettable top level cache of claim 2 further including direct mapped subsets of sizes 4, 8 and 16.

5. The subsettable top level cache of claim 2 further including a pack begin pointer within each said pack register and means for storing the pack begin cache address into the pack begin pointer identified by the pack number.

6. The subsettable top level cache of claim 5 further including means for redirecting the pack pointer, relative to the pack begin pointer, including means to wrap within subsets like a direct mapped cache wraps, thereby providing random accesses within each pack, and with the use of said pack numbers, providing random access to each of a plurality of packs, according to the needs of the executing program.

* * * * *